(12) United States Patent
Nerone

(10) Patent No.: US 6,208,086 B1
(45) Date of Patent: Mar. 27, 2001

(54) HALOGEN POWER CONVERTER WITH COMPLEMENTARY SWITCHES

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/464,896

(22) Filed: Dec. 16, 1999

(51) Int. Cl.[7] .............................. H05B 37/02; H05B 41/16
(52) U.S. Cl. ...................... 315/276; 315/209 R; 315/224
(58) Field of Search .................................. 315/224, 225, 315/209 R, 291, 219, 289, 274, 276

(56) References Cited

U.S. PATENT DOCUMENTS

| 4,972,124 | * | 11/1990 | Powers | 315/219 |
| 5,623,186 | * | 4/1997 | Archdekin | 315/276 |
| 5,917,289 | * | 6/1999 | Nerone et al. | 315/209 R |
| 5,952,790 | * | 9/1999 | Nerone et al. | 315/209 R |
| 5,955,843 | * | 9/1999 | Nuckolls et al. | 315/86 |

* cited by examiner

Primary Examiner—Haissa Philogene
Assistant Examiner—Wilson Lee
(74) Attorney, Agent, or Firm—Fay, Sharpe, Fagan, Minnich & McKee, LLP

(57) ABSTRACT

A power converter circuit is powered by a power source thereby generating a power line voltage. A rectifier is configured to rectify the power line voltage and generate a pulsating d.c. voltage with a frequency which is twice a frequency of the power line voltage. A gate drive circuit is designed to receive the pulsating d.c. voltage. The gate drive circuit drives a pair of switches which are controlled to invert the pulsating d.c. voltage, without use of level shifting. The gate drive circuit further includes a driving inductor, a timing inductor and a timing capacitor serially connected to each other and connected to the switches to control operation of the switches. The transformer, including a first transformer winding and a second transformer winding, and a capacitor are designed to receive an output signal from the switches. A lamp is connected to receive the driving signals from the transformer winding through a tap, where the tap attenuates the signal developed across the transformer winding.

14 Claims, 3 Drawing Sheets

HALOGEN POWER CONVERTER WITH COMPLEMENTARY SWITCHES

FIELD OF THE INVENTION

The present invention relates to a ballast circuit for a low voltage halogen lamp, and more particularly, to such a ballast circuit employing a pair of complementary switches in a pulsating-d.c.-to-a.c. inverter.

BACKGROUND OF THE INVENTION

The typical method of supplying low voltage lamps, halogen in particular, from a high voltage supply (e.g., 120 volt, 60 Hz) is to use conventional half-bridge, high frequency inverters. These use a level shifting scheme to periodically switch on and off the high side switch. One design would be to employ a step-down transformer between the supply voltage and the low voltage lamp. Several disadvantages of this method are that transformers operating at 60 Hz are typically larger and heavier than would be needed at higher frequencies, step-down transformers are relatively expensive, and there is no inherent short circuit protection when employing a step-down transformer.

The present invention provides a ballast circuit for halogen, or other low voltage lamps, that overcomes the foregoing drawbacks.

BRIEF SUMMARY OF THE INVENTION

A ballast circuit is described for supplying high frequency a.c. current to a load circuit incorporating a low voltage halogen or other heated filament lamp and an autotransformer, or separate coupled transformers, and a capacitance. The ballast circuit includes an a.c.—d.c. converter circuit, comprising a full-wave rectifier and capacitance, and a pulsating-d.c.-to-a.c. inverter circuit comprising first and second switches serially connected between a bus conductor and a reference conductor. The switches are connected together at a common node through which the a.c. current flows, and at a control node. Also connected between the control node and the common node is a serially connected circuit including a capacitor and two inductors. The voltage between the control node and the common node is used to determine the conduction state of the associated switches, where the time constant of the serially connected circuit determines the frequency of operation.

Also included are first and second resistors connected serially between the bus conductor and the reference conductor and also connected to the control node. A third resistor is connected between the common node and one of the bus conductor and the reference conductor, to set the initial polarity of the control node with reference to the common node.

DETAILED DESCRIPTION OF THE INVENTION

Figure 1:
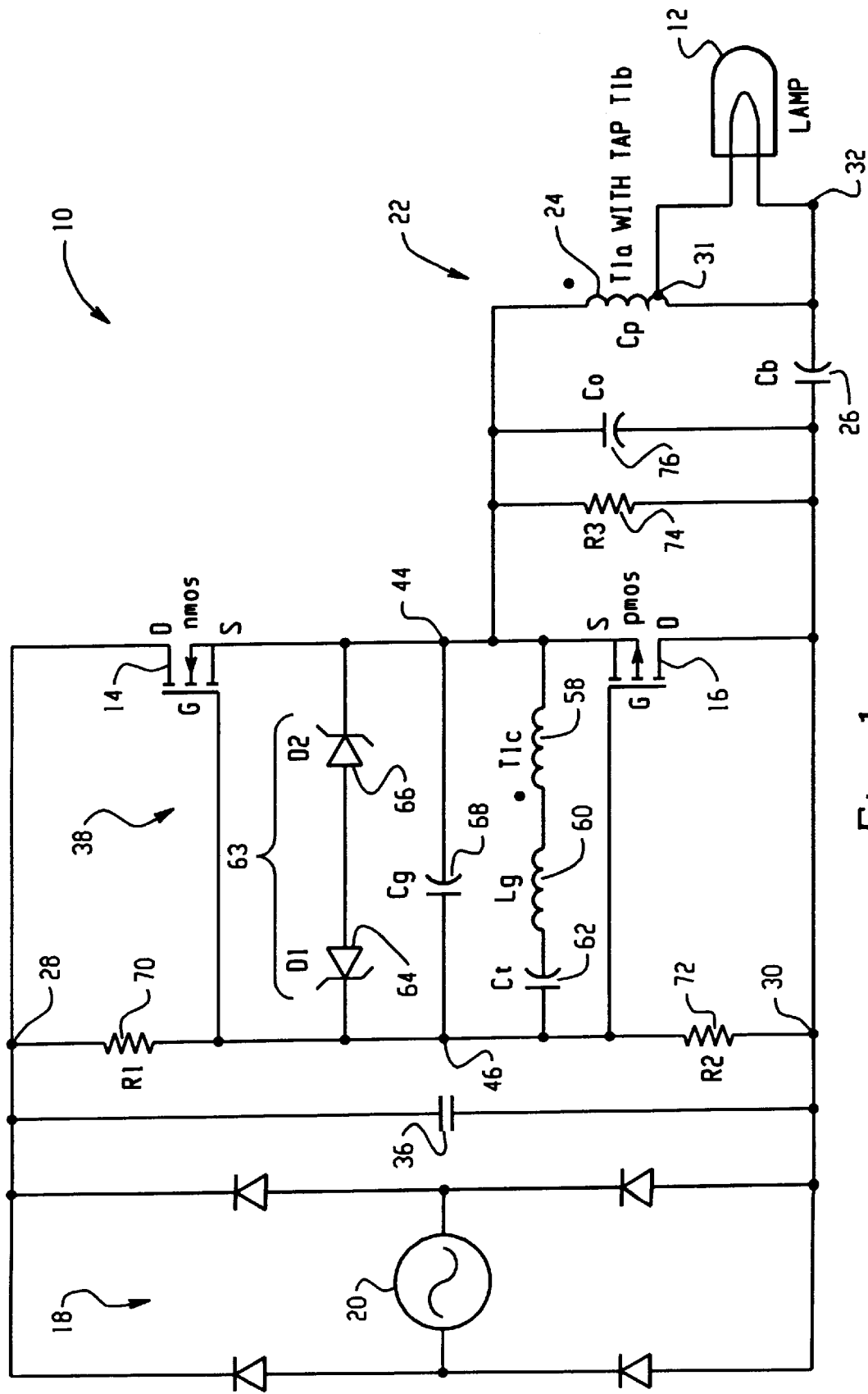
FIG. 1 is a schematic representation of a preferred embodiment of the halogen power converter circuit according to the present invention.

FIG. 1 depicts a power converter circuit 10 to drive a 12 volt halogen lamp 12. Switches 14 and 16 are respectively controlled to convert pulsating d.c. current from a full-wave bridge rectifier 18, connected to an a.c. source 20 (e.g. 120 volt, 60 Hz), to a.c. current received by a load circuit 22, comprising an inductor/transformer winding 24 and a capacitor 26. A pulsating d.c. bus voltage ($V_{BUS}$) exists between bus conductor 28 and reference conductor 30. Load circuit 22 also includes halogen lamp 12, which as shown is connected between node or tap 31 of transformer winding 24 and node 32, which also connects transformer winding 24 to capacitor 36. Capacitor 36 serves to maintain node 32 at about ½ bus voltage ($V_{BUS}$). A control circuit also called gate drive circuit 38 is provided, and in combination with switches (14, 16) form an inverter circuit configuration.

Capacitor 36 is connected across the bridge rectifier from bus conductor 28 to reference conductor 30. Capacitor 36 is provided to prevent the pulsating d.c. voltage from going to zero between cycles. Capacitor 36 can, therefore, be much smaller than a typical filter capacitor (e.g., 0.1 µF). In this way, nearly unity power factor can be observed by the power line. By preventing the pulsating d.c. voltage from approaching zero, normal regenerative control circuit 38 operation is maintained, and the circuit does not need to be restarted. Control circuit 38 would operate satisfactorily if bus conductor 28 were supplied with pure d.c. current, however, this is not necessary for operation of the halogen power converter, and the expense of an electrolytic capacitor is avoided.

Figure 2:
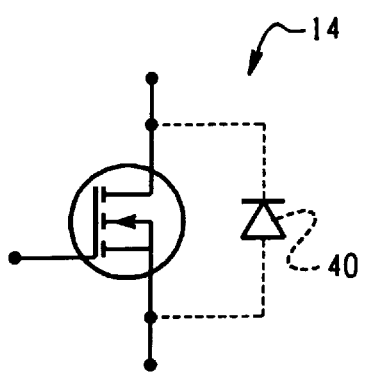
FIGS. 2–7 illustrate alternate switches that can be used in the circuit of FIG. 1.
Figure 3:
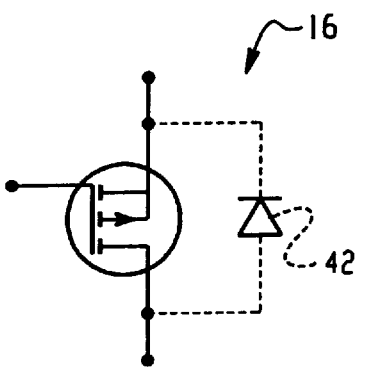

In power converter 10 of FIG. 1, switches 14 and 16 are complementary to each other in the sense, for instance, that switch 14 may be an n-channel enhancement mode device, and switch 16 may be a p-channel enhancement mode device as depicted in FIG. 1. As shown in FIGS. 2 and 3 in one embodiment, each of switches 14 and 16 include an inherent, reverse-conducting diode 40 or 42. When embodied as MOSFETs, each switch 14 and 16 has a respective gate, or control terminal. The voltage from the gate to source of switch 14 controls the conduction of that switch. Similarly, the voltage from the gate to source of switch 16 controls the conduction of that switch. As shown, the sources of switches 14 and 16 are connected together at a common node 44. With the gates of switches 14 and 16 interconnected at common control node 44, the single voltage between control node 46 and common node 44 controls the conduction state of both switches 14 and 16. The drains of the switches are connected to bus conductor 28 and reference conductor 30, respectively.

Figure 5:
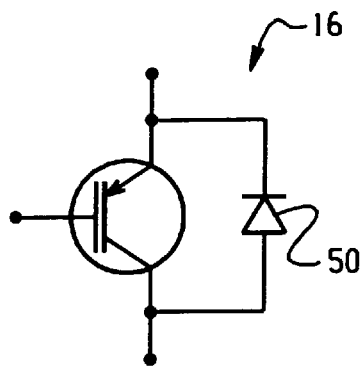
Figure 6:
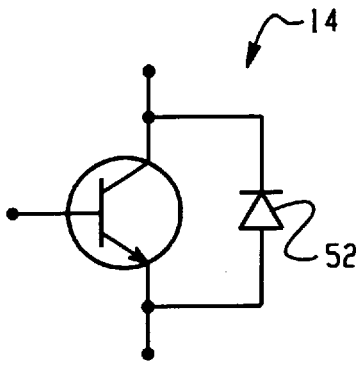
Figure 4:
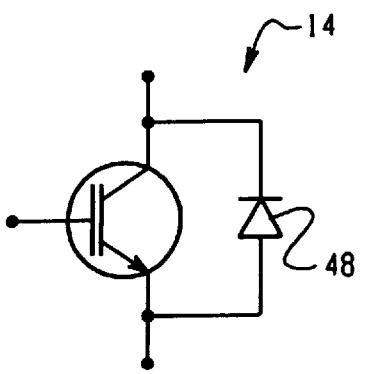
Figure 7:
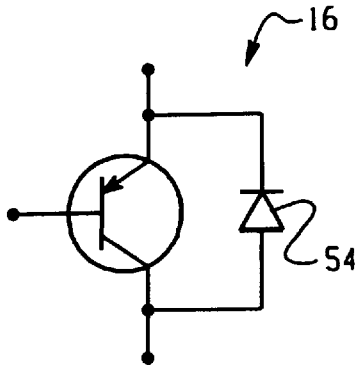

Switches 14 and 16 could alternatively be embodied as Insulated Gate Bipolar Transistor (IGBT) switches, such as the p-channel and n-channel devices respectively shown in FIGS. 4 and 5. However, each IGBT switch would then be accompanied by a reverse-conducting diode 48 or 50 as shown in FIGS. 4 and 5. An advantage of IGBTs over MOSFETs is that they typically have a higher voltage rating, enabling circuits with a wide range of d.c. input voltage values to utilize the same IGBTs. Further, switches 14 and 16 could be embodied as Bipolar Junction Transistor (BJT) switches, such as the NPN and PNP devices respectively shown in FIGS. 6 and 7. As with the IGBT switches, the BJT switches of FIGS. 6 and 7 are respectively accompanied by reverse-conducting diodes 52 and 54.

Referring back to FIG. 1, gate drive circuit 38, connected between control node 46 and common node 44, controls the conduction states of switches 14 and 16. Gate drive circuit 38 includes a driving inductor 58 that is mutually coupled to inductor transformer winding 24, and is connected at one end to common node 44. The end of transformer winding 24 connected to node 44 may be a tap from a transformer, formed by inductor windings 58 and 24. Inductors 58 and 24 are poled in accordance with the solid dots shown adjacent the symbols for these inductors. Driving inductor 58 provides the driving energy for operation of gate drive circuit 38. A second or timing inductor 60 and a timing capacitor 62 are serially connected to the remaining end of driving inductor 58, between node 46 and inductor 58.

A bi-directional voltage clamp 63, comprising Zener diodes 64 and 66 in this embodiment, clamps positive and negative excursions of gate-to-source voltage to respective limits determined, e.g., by the voltage ratings of the back-to-back Zener diodes shown. The bi-directional voltage clamp is desirable where switches 14 and 16 comprise MOSFET or IGBT switches, however, where the switches comprise BJT switches, the bi-directional voltage clamp is not necessary and can be excluded.

A capacitor 68 is preferably provided between nodes 44 and 46 to predictably limit the rate of change of gate-to-source voltage between nodes 44 and 46. This beneficially assures, for instance, a dead time interval in the switching modes of switches 14 and 16 wherein both switches are off between the times of either switch being turned on.

Resistors 70 and 72 are serially connected between bus conductor 28 and reference conductor 30. A third resistor 74 is connected across switch 16 as shown. Resistors 70 and 72 are preferably of equal value if the duty cycles of switches 14 and 16 are equal. In such case, the average voltage during steady state at common node 44 is approximately ½ of bus voltage ($V_{BUS}$) at bus conductor 28, and setting the values of resistors 70 and 72 equal results in an average voltage at intermediate node 46 also of approximately ½ bus voltage ($V_{BUS}$).

Resistor 74 serves as a charging resistor, and is preferably connected between common node 44 and reference conductor 30 as shown in FIG. 1. Resistor 74 may alternately be connected between common node 44 and bus conductor 28. Resistor 74 aids in starting the regenerative control of first and second switches 14 and 16 during initial energization in the following manner. Upon energizing of source 20, capacitor 62 becomes initially charged via resistors 70, 72 and 74. At the instant that source 20 is energized, the voltage across capacitor 62 is zero, and, during the starting process, serially-connected inductors 58 and 60 act essentially as a short circuit due to the relatively long time constant for charging of capacitor 62. If resistors 70, 72 and 74 are of equal value, for instance, the voltage on common node 44, upon initial bus energizing, is approximately ⅓ of bus voltage ($V_{BUS}$). At this instant, the current flowing through resistor 70 is approximately equally divided between resistor 72 and the serially connected sequence of capacitor 62, inductor 60, inductor 58 and resistor 74. In this manner, capacitor 62 becomes increasingly charged, from left to right as shown in FIG. 1, until it reaches the threshold voltage of the gate-to-source voltage of upper switch 14 (e.g., 2–3 volts). At this point, upper switch 14 switches into its conduction mode, which then results in current being supplied by that switch to load circuit 22. In turn, the resulting current in the load circuit causes regenerative control of first and second switches 14 and 16 by means of inductive coupling between inductors 24 and 58. Output capacitor 76 is connected in parallel to resistor 74.

The frequency of operation in the present invention is not determined by a resonant load circuit as it is in prior art ballast circuits for gas discharge lamps. In the embodiment depicted in FIG. 1, the frequency of operation is determined by the time constant of serially connected inductors 58, 60 and capacitor 62, respectively. The frequency of operation of control circuit 38 is, therefore, given by the following formula:

$$f = 1/2\pi C_t L_g \qquad (1),$$

where $C_t$ is capacitor 62, and $L_g$ is inductor 60.

The preferred frequency of operation for the halogen power converter is 30 kHz–90 kHz, however, this parameter is not critical. Note that the inverter frequency will change when the pulsating dc bus changes from the valleys of the power line to the crests. At the crests, the frequency is lowest, nearly 30 kHz, at the valleys, the inverter frequency is highest, nearly 100 kHz. This variation in the inverter frequency spreads the emissions out over a wide frequency range. Thus the inverter frequency is modulated by fluctuations in the bus voltage, which dramatically reduces the conducted EMI emissions on the power line.

The present invention satisfies at least five criteria for operating halogen lamps as enumerated below:

1. The output voltage is low (e.g., 12 volts).
2. The voltage crest factor is less than 2, which means that the peak output voltage does not exceed twice the rated lamp voltage (e.g., 24 volts for a 12 volt lamp). This ensures that no arcing occurs in the lamp. Also, this lower crest factor improves the efficiency of the inverter circuit.
3. The power converter does not reduce the life of the lamp.
4. The power converter is short circuit proof.
5. The power converter is inexpensive.

With regard to the first criterion, FIG. 1 shows the lamp 12 connected to the low voltage winding 24 of the autotransformer formed by winding 24 and winding 58.

Figure 8:
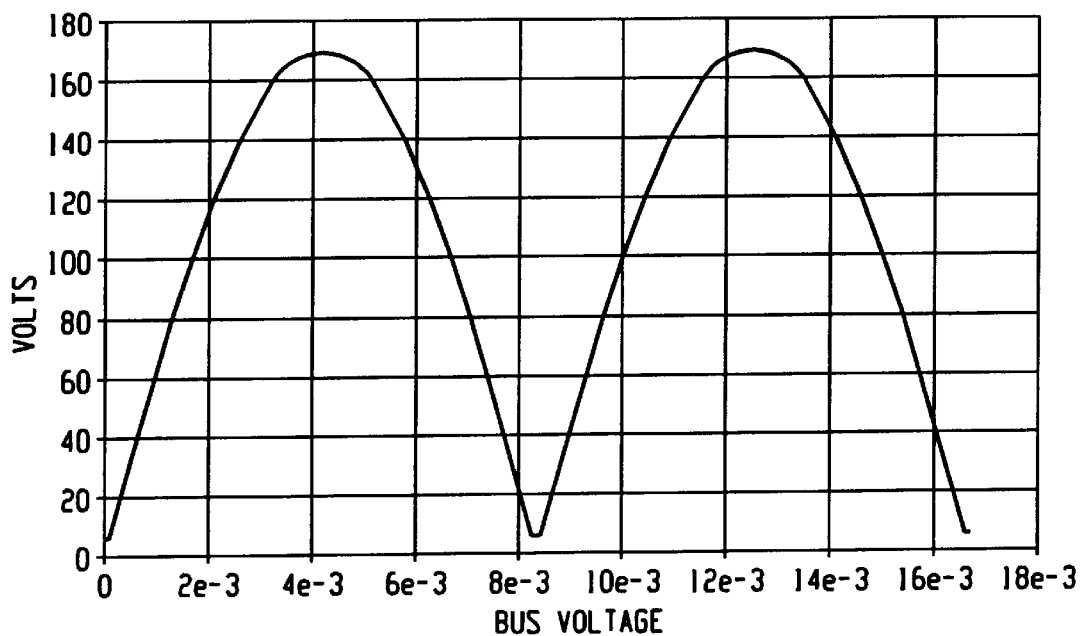
FIG. 8 is a waveform graph of a typical output voltage of the bridge rectifier ($V_{BUS}$)
Figure 9:
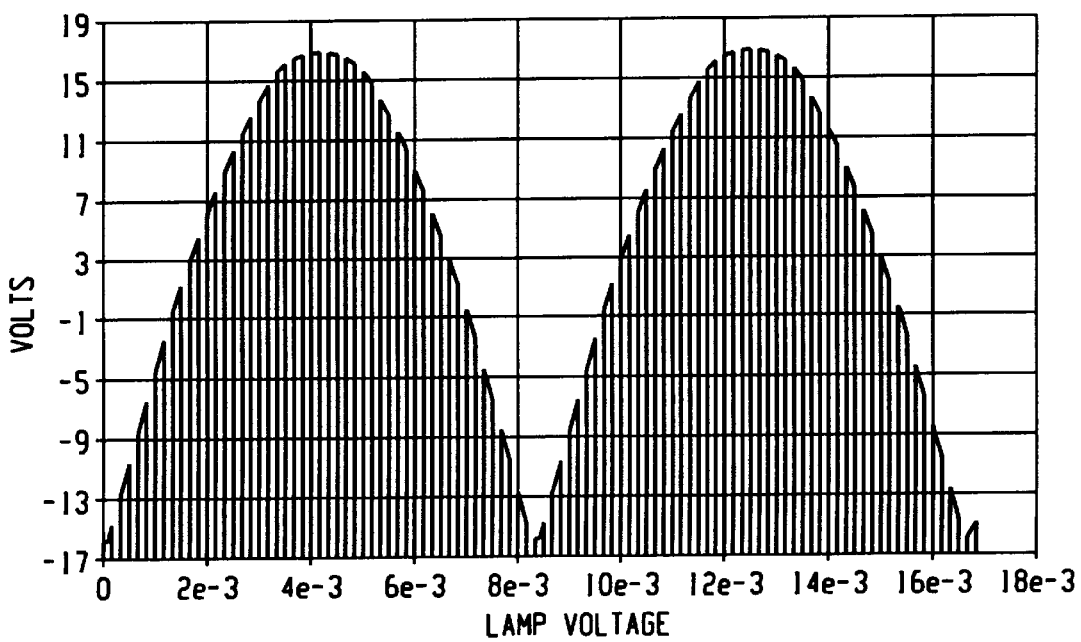
FIG. 9 is a graph of a typical voltage waveform at the halogen lamp ($V_{LAMP}$).

An explanation as to the satisfaction of the second criterion is provided below:

As discussed earlier, bus conductor 28 has a pulsating d.c. voltage impressed upon it as shown in FIG. 8. The waveform in FIG. 8 is nonzero in the valleys due to the use of capacitor 36 as previously noted. For purposes of explanation it will be assumed that a.c. source 20 is a typical 120 volt, 60 Hz sinusoidal waveform. Therefore, the peak voltage is 120 $\sqrt{2} \approx 169.7$ volts. The regenerative cycling of control circuit 38 alternately connects node 44 to bus conductor 28 and reference conductor 30 at approximately 30 kHz at the peak of the line and approximately 90 kHz at the nonzero valleys. Therefore, the waveform appearing on the upper connection of autotransformer (24, 58) is approximately a 30–90 kHz square wave with a 120 Hz sinusoidal envelope impressed upon it as illustrated graphically in FIG. 9. Please note that, for readability, FIG. 9 shows a 3 kHz waveform inside a 120 Hz envelope. The ratio of the series winding of autotransformer (24, 58) to the common winding to which lamp 12 is connected is provided via tap 31, and is selected such that the lamp voltage is, for example, 12 volts RMS for a 12 volt lamp. Since the envelope is a sinusoidal waveform, the peak voltage seen by lamp 12 will be $12\sqrt{2} \approx 17$ volts. The crest factor is, therefore, 17/10=1.7 which is less than 2 by a comfortable margin.

The third criterion is satisfied simply by ensuring that the RMS lamp voltage appearing on the common winding of autotransformer (24, 58) matches the rated lamp voltage (e.g., 12 volts), and also ensuring that the crest factor is less than 2 as explained previously. This prevents damaging arcing from occurring within the lamp.

The fourth criterion is satisfied because of the increased leakage inductance at autotransformer (24, 58). In typical prior-art power converters, line voltage is simply reduced to from 120 volts to 12 volts with a step-down transformer. The leakage inductance of a step-down transformer is insufficient to prevent damagingly high currents from flowing in the event of a short circuit across the transformer's secondary winding. In the halogen power converter of the present invention, there is adequate leakage inductance at the preferred 30 kHz to limit current to safe values.

The fifth criterion is satisfied for the following reasons. Because the transformers and inductors are operating at 30 kHz, as compared to 60 or 120 Hz for example, the transformers and inductors can be of a much smaller size as is well known in the art. Further, no electrolytic filter capacitor is required for satisfactory operation of control circuit 38. Capacitor 36 is a small capacitor (e.g., 0.1 $\mu$F), and only needs to be large enough to sustain regenerative operation of control circuit 38 in the valleys of the pulsating d.c. current supplied on bus conductor 28. Current flow through lamp 12 at that time is very small, and, consequently, capacitor 36 can be very small.

Thus, the present invention describes a power converter 10 for driving a 12 volt lamp, where power line voltage 20 is rectified and fed to the bus conductor 28 of the inverter (38, 14, 16), so no smoothing capacitor is needed. By this design, a pulsating d.c. waveform is applied to the bus conductor 28 whose fundamental frequency is twice the power line frequency. The pulsating d.c. is inverted by the complementary pair of switches (14, 16) that require no level shifting. They are driven from node 44. Tap 31 attenuates the inverter voltage developed across autotransformer (24, 58) to about 12 volts rms. This low cost method powers the 12 volt lamp at high frequency, thus reducing the size of the inductive components. It is to be understood that the disclosed power converter may be used as an integral part of a lamp system or as an external power converter.

Exemplary component values for the circuit of FIG. 1 are as follows for a lamp rated at 12 volts, with a supply voltage of 120 volts a.c.:

| | |
|---|---|
| Load inductor (24) | 10 millihenries |
| Turns ratio between (24) and (58) | 3 |
| Load capacitor (26) | 0.22 microfarads |
| Capacitor (36) | 0.22 microfarads |
| Driving inductor (58) | 75 microhenries |
| Timing inductor (60) | 1 millihenries |
| Timing capacitor (62) | 22 nanofarads |
| Zener diodes (64, 66) each | 10 volts |
| Capacitor (68) | 2.2 nanofarads |
| Resistors (70, 72, 74) each | 270 k ohms |
| Capacitor (76) | 470 picofarads |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appending claims.

What is claimed is:

1. A power converter circuit comprising:
   a power source which generates a power line voltage;
   a rectifier configured to rectify the power line voltage and generate a pulsating d.c. voltage with a frequency which is twice a frequency of the power line voltage;
   a gate drive circuit configured to receive the pulsating d.c. voltage, the gate drive circuit driving a pair of switches which are controlled to invert the pulsating d.c. voltage, without use of level shifting, where the gate drive circuit further includes a driving inductor, timing inductor, and timing capacitor serially connected to each other, and further connected to the switches to control operation of the switches;
   a transformer, including a first transformer winding and a second transformer winding, and a capacitor, designed to receive an output signal from the switches;
   a tap from the transformer winding; and
   a lamp connected to receive driving signals from the transformer winding through the tap, wherein the tap attenuates the signal developed across the transformer winding.

2. The invention according to claim 1 wherein the lamp is a Halogen lamp.

3. The invention according to claim 1 wherein the power converter is an integral part of the lamp system.

4. The invention according to claim 1 wherein the power converter is external of the lamp system.

5. The invention according to claim 1 wherein the gate drive circuit and the switches form an inverter, and a frequency of the inverter is altered in response to changes in the pulsating dc bus.

6. The invention according to claim 5 wherein the inverter frequency is at its lowest when the power line is at its crest, and the inverter frequency is at its highest when the power line is at its valleys, whereby the inverter frequency is modulated by fluctuations in the bus voltage, spreading emissions out over a wide frequency range resulting in a reduction of conducted EMI emissions on the power line.

7. A power converter for use in a ballast supplying low voltage a.c. current, to a load circuit that incorporates a low voltage lamp, from a high voltage a.c. source comprising:
   (a) a full-wave rectifier circuit for connection to a bus conductor and a reference conductor;
   (b) a pulsating-d.c.-to-a.c. converter circuit comprising first and second switches serially connected between said bus conductor and said reference conductor, being connected together at a common node through which said a.c. current flows and having a shared control node, the voltage between said control node and said common node determining the conduction state of the associated switch;
   (c) the load circuit comprising:
      (i) a transformer and a capacitor serially connected between said common node and said reference conductor, the transformer being of sufficient leakage inductance to provide short circuit protection; and
      (ii) a low voltage lamp connected to nodes such that it bridges the common winding of said autotransformer; and
   (d) a regenerative control circuit bridging said common node and said control node comprising:
      (i) a first driving inductor mutually coupled to said transformer in such manner that a voltage is induced therein which is proportional to the instantaneous rate of change of said a.c. current;
      (ii) a second serially connected timing inductor; and
      (iii) a serially connected timing capacitor, the timing capacitor and timing inductor selected such that their serially combined timing constant determines the frequency of operation of said power converter.

8. The power converter of claim 7 wherein said lamp comprises a heated filament lamp.

9. The power converter of claim 7 wherein said lamp comprises a halogen lamp.

10. The power converter of claim 7 wherein said autotransformer comprises mutually coupled inductances.

11. The power converter of claim 7 wherein:
   (a) said switches comprise one of MOSFET and IGBT switches; and
   (b) a bi-directional voltage clamp is connected between said control node and said common node.

12. The power converter of claim 11 wherein said bi-directional voltage clamp comprises back-to-back Zener diodes.

13. The power converter of claim 7 wherein said switches comprise BJT switches.

14. A power converter for use in a ballast supplying low voltage a.c. current, to a load circuit that incorporates a low voltage lamp, from a high voltage source comprising:
   (a) an a.c.-to-pulsating-d.c. converter circuit comprising a full-wave rectifier bridged with a small first capacitor, for connection to a bus conductor and a reference conductor;
   (b) a pulsating-d.c.-to-a.c. converter circuit comprising first and second switches serially connected between said bus conductor and said reference conductor; being connected together at a common node through which said a.c. current flows; and having a shared control node, the voltage between said control node and said common node determining the conduction state of the associated switch;
   (c) first and second resistors serially connected between said bus and reference conductors, with their intermediate node connected to said control node;
   (d) a third resistor connected between said common node and one of said bus conductor and said reference conductor;
   (e) an autotransformer with one end connected to said common node;
   (f) a second capacitor connected between said reference conductor and the remaining end of said autotransformer;
   (g) a first lamp node connected to the center terminal of said autotransformer;
   (h) a second lamp node connected to the common point between said autotransformer and said second capacitor with provision for connecting said low voltage lamp between said first and second lamp nodes;
   (i) a third capacitor connected in parallel with said third resistor;
   (j) a fourth capacitor connected between said common node and said control node;
   (k) a first driving inductor mutually coupled to said autotransformer in such manner that a voltage is induced therein which is proportional to the instantaneous rate of change of said a.c. current;
   (l) a second timing inductor connected at one end to said driving inductor; and
   (m) a fifth timing capacitor connected serially between said control node and the remaining end of said timing inductor being selected such that the timing constant of said timing inductor serially connected to timing capacitor determine the frequency of operation of said power converter.

* * * * *